Patented Oct. 20, 1953

2,656,265

UNITED STATES PATENT OFFICE 2,656,265

METHOD AND COMPOSITION FOR THE CONTROL OF UNDESIRED VEGETATION

Wendell R. Mullison, Midland, Mich., assignor to The Dow Chemical Company, Midland, Mich., a corporation of Delaware No Drawing. Application December 20, 1951, Serial No. 262,670

6 Claims. (Cl. 71—2.3)

1

This invention is concerned with the control of the growth of plants and is particularly directed to a composition and method for the control of undesired vegetation.

Rapid advances have been made in recent years in the development of chemicals for the control of undesired vegetation. However, many such chemicals are applied after the growing season has progressed so that weed populations have already become established and have begun to deplete the soil of nutrients and moisture. Moreover, many of the presently used materials may cause damage by contact of drifting dust or spray with desirable vegetation growing in close proximity to the area being treated for weed control. A further problem is presented in lumber storage areas, railway roadbeds, transformer yards and the like in which it is desirable to suppress the growth of all vegetation. In such operations certain of the currently available agents are unsuitable because of the fire hazard involved in their use or because of physical factors such as water solubility which result in rapid dissipation of the active material.

It is among the objects of this invention to provide an improved method for the control of undesired vegetation. Another object is to provide an improved method for the temporary sterilization of soil. A further object is the provision of a method for the control of germinating seed and young seedlings of undesired vegetation before it has had an opportunity to deplete the soil of nutrients and moisture. Yet another object is to provide a novel composition adapted to be employed for the indicated herbicidal control. Other objects will become apparent from the following specification and claims.

According to the present invention, it has been discovered that germinating seeds and young seedlings of many plants are controlled by inhibition or killing when exposed to the action of a growth-inhibiting amount of 2-(4-chloro-o-toloxy)ethanol, having the formula

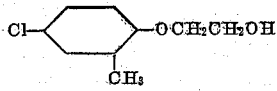

This novel compound appears to have a high toxicity to germinating seed and to the roots of newly germinated seedlings, particularly those of broadleafed plants. However, the compound has been found not particularly active as regards its effect on the aerial portion of plants, for example on the stems and true leaves, in contrast to the conventional plant growth control agents such as the naphthoxy- and haloaryloxy-aliphatic acids. Thus, in the practice of the present invention, it is possible to accomplish the control of weed seedlings while avoiding, in general, the extensive injury to the leaf and stem portions of well developed or mature vegetation.

2-(4-chloro-o-toloxy)ethanol is a crystalline solid, melting at 51°–53° C., substantially insoluble in water but soluble in many organic solvents. It is conveniently prepared by reacting sodium 4-chloro-o-cresolate with ethylene chlorohydrin. The substituted ethanol compound is described and claimed as a new compound in the application of Dalton B. McCaskey, Serial No. 262,655, filed concurrently herewith.

In the practice of the invention, the control of undesired plants is conveniently accomplished by distributing the toxic compound in or on soil or other growth media such as peat, compost or gravel, ordinarily infested with the seeds of the vegetation concerned. In general, any convenient method of application is suitable, provided that the active compound is distributed in the growth medium so as to contact the seed or the roots or other tender growth organs of the newly germinated seedlings of the vegetation to be controlled. The results obtained in such operations will vary depending upon the quantity of the substituted ethanol compound employed per acre and on the depth of the soil through which the compound is distributed as well as the plant species concerned. For example, considerable selectivity in vegetation control may be accomplished by proper placement of the toxicant so as to control weed species germinating in the uppermost layer of the growth medium without harming a more deeply seeded crop. In practice, good results are frequently obtained without complete killing of the undesired plants. Thus, for example, rapidly growing crops such as sugar cane, soybeans, small grains and the like are benefited if the weed species are stunted until the crop plant becomes well established so as to choke out the stunted weeds.

In carrying out the invention, the 2-(4-chloro-o-toloxy)ethanol may be compounded to form either dust or spray compositions. One preferred embodiment of the invention includes mixtures of the active ingredient with a finely divided inert solid such as talc, pyrophyllite, gypsum, diatomaceous earth and the like. Similarly, combinations of the active ethanol compound with fertilizers or other soil conditioners may be employed. Where the mixture with solid diluent is to be applied as a dust, the inclusion of wetting, sticking and emulsifying agents in the above-described finely divided composition is optional. However, where it is desirable to apply the active ingredient in water, the dust mixture is modified with suitable surface-active dispersing agents and employed as a concentrate. Alternatively, the 2-(4-chloro-o-toloxy) ethanol may be compounded with a suitable dispersing agent with or without the inclusion of an organic solvent to prepare emulsifiable compositions to be employed as spray concentrates.

Wetting, emulsifying and surface-active dispersing agents compatible in the present compositions include alkali and alkaline earth metal caseinates, blood albumen, alkali metal salts of long chain aliphatic sulfates, partially neutralized sulphuric acid derivatives from petroleum and from naturally occurring glycerides, soaps, alkyl aryl sulfonates, condensation products of alkylene oxides with phenols and organic acids, alkanolamines and complex ether alcohols and esters, as well as clays such as bentonite, attapulgite and the like. When utilizing the clays as surface active dispersants it is frequently convenient to employ an excess of the clay mineral over and above the minimum required for accomplishing the desired dispersion, in such case the excess clay serving as a finely divided solid diluent.

A further preferred embodiment of the invention consists of emulsifiable liquid concentrate compositions comprising 2-(4-chloro-o-toloxy)-ethanol and an oil soluble emulsifying agent. In preparing such compositions, it is frequently desirable to include a suitable organic solvent. The preferred emulsifying agents are oil soluble and include particularly the non-ionic emulsifiers such as condensation products of alkylene oxides with phenols and organic acids, complex ether alcohols and esters, polyalkylene oxide derivatives of hexitol-fatty acid esters and the like, although oil soluble ionic emulsifying agents, such as the mahogany soaps derived from petroleum may also be used. The solvents which may be used in preparing the above compositions includes hydrocarbon distillates derived from petroleum, aromatic hydrocarbons such as benzene, toluene, xylene and methylated naphthalenes, lower aliphatic alcohols and ketones, halogenated hydrocarbons and synthetic organic oils.

The proportion of materials employed in the compositions may vary considerably depending upon how the composition is to be employed and whether or not it is designed as a concentrate. Dust compositions for direct application to soil may contain from as little as 0.25 percent to 50 percent by weight of the active ingredient. For use as a concentrate in the preparation of sprays or more dilute dusts, the content of active ingredient may run from 10 percent to as high as 90 to 95 percent by weight, the balance of the composition being one of the diluents and carriers and/or wetting and emulsifying agents previously mentioned. Liquid dispersions of the toxicant in water or an organic solvent similarly may vary in concentration from a very low percentage of the active ingredient, for example, 0.001 to 10 percent by weight, where the dispersion is to be applied to the soil, to a relatively high percentage, for example 5 to 50 percent by weight or higher, where the dispersion is to be employed as a concentrate.

The compositions of the present invention are conveniently applied to or dispersed in the soil by either spraying or dusting. Alternatively, they may be dispersed in irrigation water and so distributed over and through the soil. The techniques involved in application of spray and dust materials are well established and conventional equipment suffices in the present situation. It is required however, that relatively uniform distribution of the compositions be obtained and that the compositions, as deposited on or in the soil, provide a toxic concentration of the active ingredient so positioned as to be contacted by the emerging seedlings of the undesired vegetation. Where dusting is employed, the surface of the soil may be dragged or otherwise worked to distribute the toxicant.

The amount of the active ethanol compound to be applied varies depending upon such factors as the type of soil, rainfall conditions, the variety of plants to be controlled and whether selective control or temporary sterilization is desired. Good results may be obtained when applying from ½ pound to 100 pounds per acre. In general, from 0.5 to 2 pounds of the toxicant are applied per acre for selective control while from 2 to 10 pounds per acre are applied for the control of more resistant species. For temporary sterilization, amounts of from 10 to 100 pounds per acre are used. In applications which involve no subsequent distribution steps such as discing or dragging the compound will be distributed in only the uppermost layer of soil. In particular, when the application is carried out subsequent to seeding of the area with a deeply planted crop but prior to emergence of the desired crop plants, it is preferred that the distribution of the toxic chemical be confined to the upper ⅓ to ½ inch of the soil. Where temporary sterilization is desired, the active compound may be worked into the upper 2 to 6 inches of the soil. In any case, it is desirable that a toxic concentration of the chemical be maintained in the zone of the soil where it will contact the seed and young seedlings of the vegetation to be controlled. Good results have been obtained when employing a concentration of about 120 milligrams of the 2-(4-chloro-o-toloxy)ethanol toxicant per cubic foot of soil.

It is among the advantages of the present invention that the active toxicant has a high degree of persistency in the soil, however, under normal conditions of moisture, aeration and soil flora, the herbicidal effect of the toxicants is dissipated in from a few weeks to several months depending on the concentration of toxicant employed.

The following examples illustrate the invention but are not to be construed as limiting the same:

*Example 1*

The following concentrate composition was prepared by mixing the ingredients with stirring at room temperature

| | Parts by weight |
|---|---|
| 2-(4-chloro-o-toloxy) ethanol | 25 |
| Non-ionic emulsifying agent | 10 |
| Xylene | 65 |

The non-ionic emulsifying agent used (Triton X-155) is identified as an alkyl phenol-ethylene oxide condensation product. This concentrate is an oily liquid, readily dispersible to form aqueous emulsions for herbicidal use. The composition is also suitable for dilution with an oil to prepare herbicidal oil sprays.

Example 2

Areas of a clay loam soil were worked into seed bed conditions and planted to alsike clover, radish and millet to act as representative seed species. Aqueous dispersions of the composition of Example 1 were applied to separate areas of the above-described seed bed to give dosages of 1 and 2 pounds of the 2-(4-chloro-o-toloxy)-ethanol toxicant per acre. The treated areas were in a greenhouse and were maintained under optimal seed germination conditions for a period of two weeks, with daily watering. Adjacent untreated areas which had been prepared and seeded, were maintained as checks. On observation at the end of two weeks, alsike clover, radish and millet had emerged in the untreated check areas and were growing vigorously. In contrast, no radish or alsike clover seedlings were found in either of the treated plots. Millet, representative of gramineous species, germinated and emerged in both treated areas but the resulting plants were severely stunted in the area treated at the 2 pound dosage.

Example 3

Clay loam soil was prepared and seeded as in the preceding example. The composition of Example 1 was dispersed in water to prepare an aqueous emulsion containing 0.034 pounds of the substituted ethanol toxicant per 100 gallons. This aqueous emulsion was applied as a soil drench at the rate of 11,727 gallons per acre to give a dosage of 4 pounds of the toxicant per acre. The emulsion appeared to give a penetration to a depth of about 4 inches. The treated area was in a greenhouse and was maintained under optimal seed germinating conditions for a period of two weeks with daily watering. On observation, at the end of the two week period, no seedlings were found to have emerged in the treated area. In an adjacent untreated area, prepared and seeded in similar fashion, all test species had emerged and were growing vigorously.

Example 4

2-(4-chloro-o-toloxy)ethanol is mechanically mixed with Attaclay, a commercial attapulgite-type clay, to prepare the following composition:

| | Parts by weight |
|---|---|
| 2-(4-chloro-o-toloxy)ethanol | 40 |
| Attaclay | 60 |

This mixture is hammermilled through a $\frac{1}{32}$ inch screen to prepare a wettable powder concentrate. The concentrate, as prepared above, is dispersed in water in a power spray rig equipped with a mechanical agitator to prepare a spray composition containing 2 pounds of the active ethanol compound per 100 gallons of spray. The spray dispersion is applied to a field previously fitted and planted with seed pieces of sugar cane. The application is controlled so as to apply about 200 gallons of the spray dispersion per acre. Good control of annual weed species is obtained and the sugar cane crop develops without annual weed competition.

Example 5

2-(4-chloro-o-toloxy)ethanol is mechanically mixed with diatomaceous earth and pyrophyllite to prepare the following composition:

| | Parts by weight |
|---|---|
| 2-(4-chloro-o-toloxy)ethanol | 5 |
| Diatomaceous earth | 10 |
| Powdered pyrophyllite | 85 |

The mixture is milled in an air reductionizer to prepare a finely divided intimate mixture suitable for dusting. This dust composition is applied in the early spring to an industrial area, using a commercial dusting apparatus with the nozzles directed downward. A drag and roller combination is employed directly behind the duster to provide for uniform distribution of the dust. The application is carried out so as to distribute the above composition at the rate of 200 pounds per acre to give a dosage of 10 pounds of the active toxicant per acre. Good control of annular weeds, particularly broadleaf species, is obtained.

I claim:

1. A method for inhibiting the growth of germinant seeds and young seedlings which comprises the step of distributing in the growth medium a composition containing as an active toxic ingredient 2-(4-chloro-o-toloxy)ethanol.

2. A method for inhibiting the growth of seedlings which comprises the step of exposing seed to the action of 2-(4-chloro-o-toloxy)ethanol.

3. A composition for the control of undesired vegetation which comprises a carrier and dispersed in intimate mixture therewith 2-(4-chloro-o-toloxy)ethanol.

4. A herbicidal concentrate composition which comprises a surface-active dispersing agent in intimate mixture with 2-(4-chloro-o-toloxy)ethanol.

5. A composition for the control of undesired vegetation which comprises a finely divided inert solid and intimately mixed therewith 2-(4-chloro-o-toloxy)ethanol.

6. A method for controlling the growth of undesired vegetation which comprises distributing 2-(4-chloro-o-toloxy)ethanol in the soil and in close proximity to the seeds of such vegetation, the concentration of the substituted ethanol derivative in the soil being such as to be toxic to the organs of the plants upon germination of the seed.

WENDELL R. MULLISON.

References Cited in the file of this patent

UNITED STATES PATENTS

| Number | Name | Date |
|---|---|---|
| 2,396,513 | Jones | Mar. 12, 1946 |
| 2,472,347 | Sexton | June 7, 1949 |

OTHER REFERENCES

Botanical Gazette—vol. 107 (1946) pages 475 to 507 (page 489 particularly relied upon).